United States Patent [19]

Longoria

[11] Patent Number: 4,576,395
[45] Date of Patent: Mar. 18, 1986

[54] TRAILER HITCH MOUNTED TOOL SUPPORT

[76] Inventor: Heron Longoria, 713 N. 16th St., McAllen, Tex. 78501

[21] Appl. No.: 604,361

[22] Filed: Apr. 26, 1984

[51] Int. Cl.⁴ .............................................. B60R 9/06
[52] U.S. Cl. .............................. 280/511; 224/42.03 R; 224/42.07
[58] Field of Search .................... 280/511, 769, 415 A, 280/402, 423 R; 224/42.07, 42.01, 42.03 R, 42.03 A, 42.03 B, 42.42

[56] References Cited

U.S. PATENT DOCUMENTS

| | | | |
|---|---|---|---|
| 3,858,775 | 1/1975 | Haas | 224/42.03 B |
| 4,412,635 | 11/1983 | Bateman | 280/42.03 R |

FOREIGN PATENT DOCUMENTS

| | | | |
|---|---|---|---|
| EP37599 | 10/1981 | European Pat. Off. | 224/42.03 A |
| 8100211 | 8/1982 | Netherlands | 224/42.03 R |

*Primary Examiner*—John A. Pekar
*Attorney, Agent, or Firm*—Harvey B. Jacobson

[57] ABSTRACT

An upstanding support is provided and open at its lower end for snug downward telescoping over an upwardly projecting hitch ball supported from a hitch tongue of a width greater than the diameter of the ball. The lower end of the upstanding support is downwardly abuttable against the upwardly facing surfaces of the hitch tongue spaced immediately outward of an upstanding cylindrical zone containing the outer periphery of the hitch ball and the support includes a plurality of circumferentially spaced clamp screws threadingly supported therefrom with the innermost ends of the clamp screws being clampingly engageable with the reduced diameter shank portion of the hitch ball spaced closely above the hitch tongue. The upper end of the upstanding support mounts a horizontal mounting plate therefrom which may be utilized to support a plurality of different objects such as a grinder, workbench, hoist, cycle carrier, sign, floodlight, pipe rack and the like.

12 Claims, 6 Drawing Figures

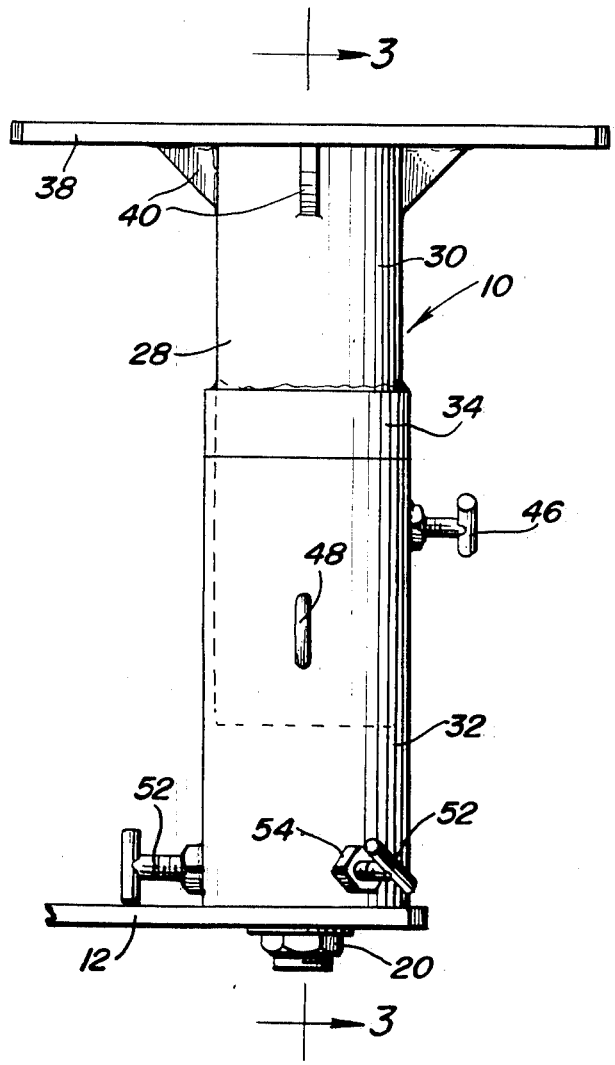
FIG. 1
FIG. 2
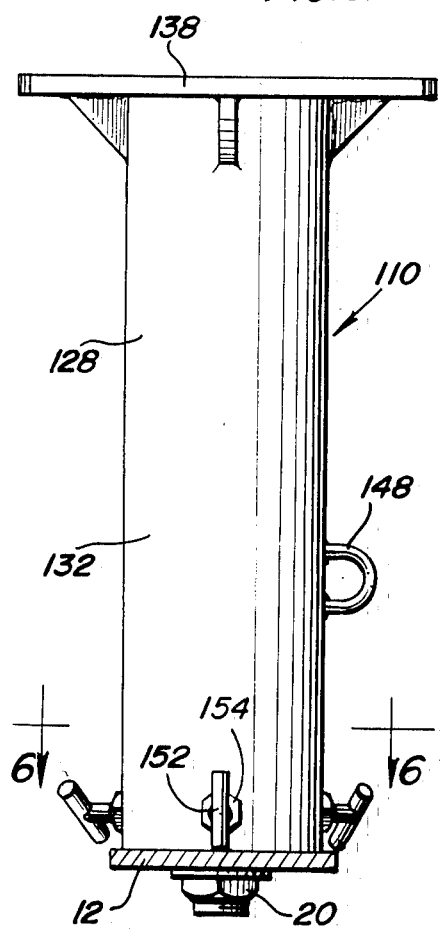
FIG. 5
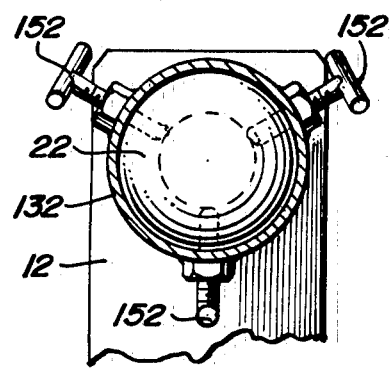
FIG. 6

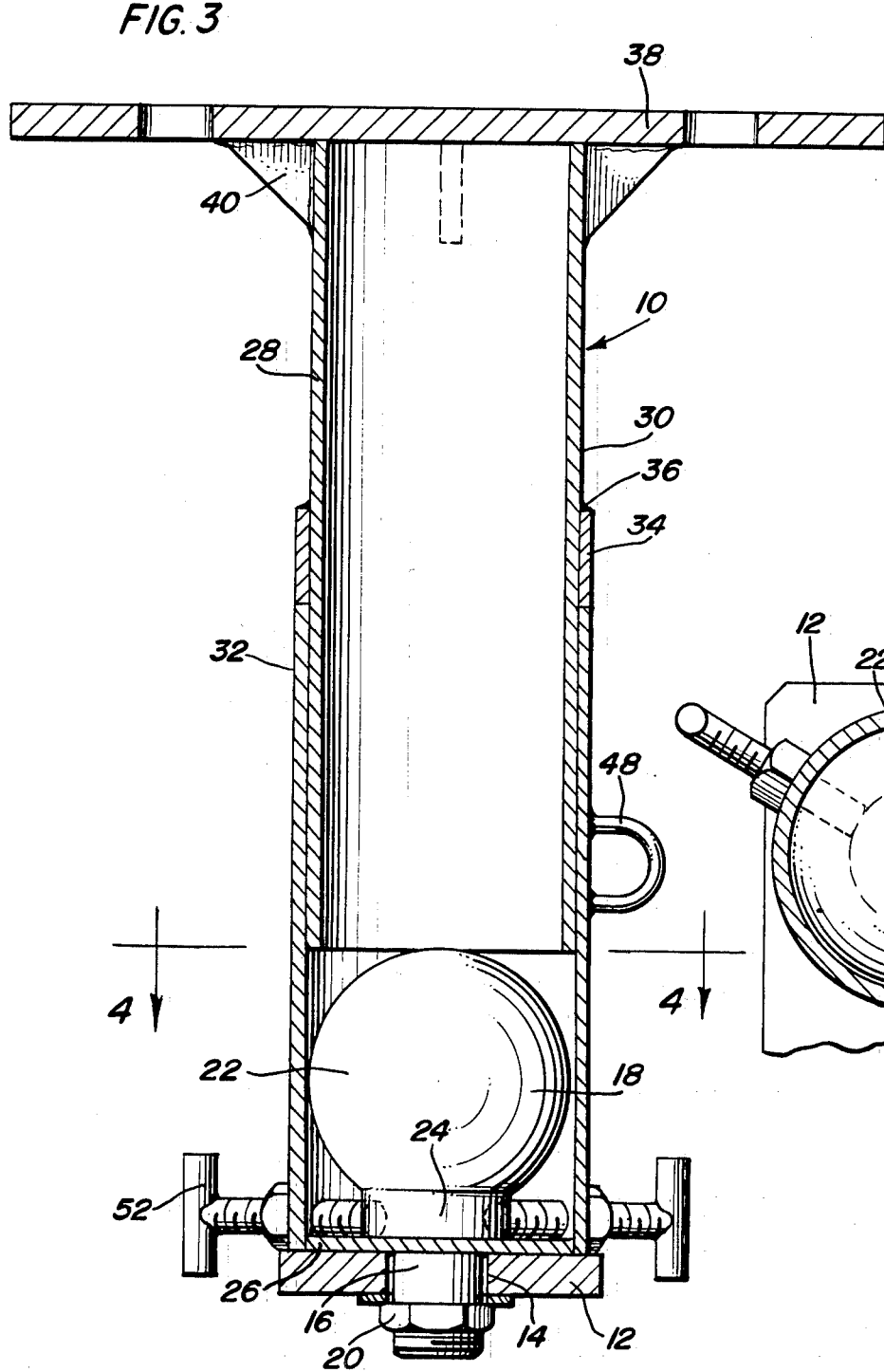

4,576,395

TRAILER HITCH MOUNTED TOOL SUPPORT

BACKGROUND OF THE INVENTION

Many vehicles include rear mounted trailer hitches which are used substantially exclusively for the purpose of coupling trailers to the associated vehicles. However, trailer hitches, for the most part, include strong connections with the associated vehicle frames and are therefore also adaptable for use as supports for various different objects.

U.S. Pat. Nos. 3,650,443, 3,858,775, 4,381,096 and 4,412,635 disclose trailer hitch mounted supports of various types and U.S. Pat. Nos. 3,606,385, 4,241,858 and 4,413,761 disclose various vehicle bumper mounted article supporting structures. However, these previously known devices do not include the relatively simple structural and operational features of the instant invention.

BRIEF DESCRIPTION OF THE INVENTION

The tool support of the instant invention comprises an upstanding tubular member whose lower end may be snugly downwardly telescoped over a hitch ball supported from a rearwardly projecting hitch ball supporting tongue mounted on the rear of a vehicle. The lower end edge of the tubular member is abuttingly engageable with those upwardly facing surfaces of the tongue disposed immediately outward of a cylindrical area containing the outer peripheral portions of the hitch ball and the lower end portion of the tubular member includes a plurality of circumferentially spaced and generally radially inwardly projecting and threadedly supported clamp screws whose inner ends are clampingly engageable with the diametrically reduced shank portion of the hitch ball disposed immediately above the ball supporting tongue. Thus, the support of the instant invention may be readily removably mounted upon a conventional tow hitch merely through the utilization of threaded radial clamp screws. The upstanding support may include any suitable support structure on the upper end thereof by which a suitable article to be supported from the associated hitch may be mounted. Further, the upstanding support may be constructed so as to be longitudinally extendable, thereby enabling any article to be supported therefrom to be adjusted in height relative to the associated trailer hitch tongue.

In addition, the instant invention also is inclusive of a novel ball and tube or pipe connection which may be used independent of a trailer hitch mounted ball. The tube and ball connection may be used as a floor anchor in conjunction with a floor anchored ball and such a floor anchored ball may be removably floor anchored through the utilization of a floor anchored nut from which the ball may be unthreaded. Further, the ball and tube or pipe connector may be used as a removable pipe coupler and as a connector between any tubular member and an anchored ball member.

The main object of this invention is to provide a novel mount by which various articles may be mounted in elevated position relative to and from the hitch ball of a conventional trailer hitch.

Another very important object of this invention is to provide a new and useful pipe coupler.

Still another object of this invention is to provide a ball member and pipe coupling constructed in a manner whereby a pipe section may be readily releasably mounted relative to a ball member having the general configuration of a hitch ball member.

Another object of this invention is to provide a vehicle trailer hitch mounted support structure including means whereby the effective mounting height of an article to be supported therefrom may be adjusted.

A final object of this invention to be specifically enumerated herein is to provide an apparatus in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side elevational view of the support of the instant invention in operative association with a fragmentarily illustrated conventional form of trailer hitch;

FIG. 2 is a top plan view of the support;

FIG. 3 is an enlarged vertical sectional view taken substantially upon the plane indicated by the section line 3—3 of FIG. 1;

FIG. 4 is a horizontal sectional view taken substantially upon the plane indicated by the section line 4—4 of FIG. 3;

FIG. 5 is a front elevational view of a modified form of support; and

FIG. 6 is a horizontal sectional view taken substantially upon the plane indicated by the section line 6—6 of FIG. 5.

DETAILED DESCRIPTION OF THE INVENTION

Referring now more specifically to the drawings the numeral 10 generally designates the tool support of the instant invention which is illustrated in FIG. 1 in operative association with the rearwardly projecting hitch ball supporting bar portion 12 of a conventional form of vehicle mounted trailer hitch. The bar portion 12 has a vertical bore 14 formed therethrough, see FIG. 3 and the shank portion 16 of a conventional hitch ball 18 is secured downwardly through the bore 14 by the usual threaded nut 20. The hitch ball 18 includes a substantial spherical ball portion 22 mounted atop the shank portion 16 by a somewhat enlarged shank portion 24 downwardly abutted against a washer 26 disposed on the shank portion 16 and downwardly abutted against the upper surface of the bar portion 12. The outside diameter of the washer 26 is substantially equal to the diameter of the ball portion 22. In some instances the washer 26 is formed as an integral enlarged flange portion or shoulder carried by the shank portion 24 or by the bar portion 12. Further, the bar portion 12 and hitch ball 18 are to be considered as conventional.

The support 10 includes an upstanding tubular standard 28 including upper and lower tubular sections 30 and 32. The lower end of the tubular section 30 is downwardly telescoped into the upper end of the tubular section 32 and the lower end of the tubular section 32 is removably snugly downwardly telescoped over the ball portion 22 and the washer 26 with the lower end of the tubular section 32 abutted against the upper surface of the bar portion 12.

The tubular section 30 includes an abutment defining sleeve 34 snugly telescoped thereover and secured thereto by welding 36 with the abutment sleeve 34 centrally located between the opposite ends of the tubular section 30. The abutment sleeve 34 downwardly abuts the upper end of the tubular section 32 and thereby limits downward telescoping of the tubular section 30 into the upper end of the tubular section 32.

The upper end of the tubular section 30 has a horizontal mounting plate 38 mounted thereon and braced relative thereto by bracing gussets 40 and the plate 38 includes a plurality of mounting slots 42 and 44 formed therein. The mounting slots 42 and 44 are arranged in concentric circular patterns of radial slots and the patterns of slots are concentric with the longitudinal center axis of the standard 28.

The tubular section 32 is equipped with a threadedly supported setscrew 46 which may be used to retain the section 30 in adjusted angular displaced positions relative to the section 32 and the section 32 includes an anchor eye 48 which may be used in conjunction with a chain and lock (not shown) to lock the section 32 to the bar portion 12.

With attention now invited more specifically to FIGS. 5 and 6 of the drawings, a modified form of support is referred to in general by the reference numeral 110. The modified support 110 is substantially identical to the support 10, except that the standard 128 thereof is of one piece constructon and thereby includes only a tubular section 132 corresponding to the tubular section 32, but which is full height and extends the full distance between the bar portion 12 and the mounting plate 138 of the support 110. Otherwise, the support 110 is identical to the support 10 and the various components thereof are designated by reference numerals in the 100 series corresponding to the reference numerals applied to the support 10.

It is believed that it will be obvious that various different structures such as a pipe vise, a grinder, a cycle holder, a sign standard, a pipe rack and a spare tire mount may be mounted from the mounting plate 38. Further, when the support 10 is utilized, the mounting plate 138 may be adjustably angularly displaced about the center axis of the standard 28. Further, it is believed that it may be readily visualized that a floor anchor including a threaded bore such as that defined by the nut 20 may be used for removably supporting the hitch ball 18 from a floor surface and that such a floor mounted hitch ball could be readily used to anchor an upright tubular standard to the associated floor. Further, the hitch ball may also be mounted through an end wall secured across one end of a first pipe section and utilized to secure a second pipe section to the first pipe section in axial alignment therewith. Also, similar releasable pipe connections may be used in the construction of removable fence post accessories and in the construction of tubular frame component joining structures.

In order to secure the tubular sections 32 and 132 in position, they are provided with lower end threadingly supported setscrews 52 and 152, respectively. The setscrews 52 and 152 may be threadingly supported from nuts 54 and 154 secured about the lower ends of the sections 32 and 132 and extendable and retractable through openings (not shown) provided in the sections 32 and 132. The inner ends of the setscrews 52 are clampingly engageable with the shank portion 24 and thereby prevent upward displacement of the tube sections 32 and 132 from the bar portion 12.

Inasmuch as the lower ends of the tube sections 32 and 132 are snugly telescoped over the corresponding washers and ball portions 22 and 122, lateral displacement of the mounting plates 38 and 138 is substantially prevented independent of the clamping action of the setscrews 52 and 152 on the corresponding shank portions 24. The clamping action of the setscrews 52 and 152 on the corresponding shank portions 24 is provided merely to prevent upward displacement of the sections 32 and 132 from the bar portions 12.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A support for use in conjunction with a conventional trailer hitch of the type including a horizontally projecting bar portion having an upper surface and a hitch ball projecting upwardly from said bar portion including an upper generally spherical ball portion, a shank depending downwardly from said ball portion and extending and secured downwardly through said bar portion and an enlarged abutment disc on an intermediate portion of said shank downwardly abutted against the upper surface of said bar portion and being of substantially the same outside diameter as the diameter of said ball portion and with said upper surface projecting horizontally outwardly of an upstanding cylindrical zone containing the outer peripheries of said ball portion and abutment disc, said support including an upstanding support whose lower end defines a downwardly opening cylindrical cavity therein for snug downward telescoping of the lower end of said support member over said ball portion and abutment disc and with the lower end of said support member downwardly abutted against said upper surface, said support member including a plurality of peripherally spaced setscrews threadingly supported therefrom and projectable and retractable generally radially of said cylindrical cavity at a predetermined level above the lower end of said cavity for clamp engagement with said shank intermediate said ball portion and disc, the upper end of said support including mounting means for mounting various different objects from the upper end of said support.

2. The support of claim 1 wherein said upstanding support member comprises a one piece upstanding tubular standard.

3. The support of claim 1 wherein said support member includes an upstanding tubular standard, said standard including upper and lower inner and outer relatively telescoped sections, the interior of the lower end of said lower section defining said recess, an intermediate length portion of said upper section including an abutment sleeve telescoped thereover and secured thereto downwardly abutted against the upper end of said lower section, said lower section including a generally radial setscrew threadingly engaged therewith and releasably clampingly engaged with a lower end portion of said upper section registered therewith.

4. The support of claim 1 wherein said upstanding support member includes an anchor eye supported from the lower end portion thereof for locked chain anchoring of said support member from said bar portion.

5. In combination with a conventional trailer hitch of the type including a horizontally projecting bar portion having an upper surface and a hitch ball projecting upwardly from said bar portion including an upper generally spherical ball portion, a shank depending downwardly from said ball portion and extending and secured downwardly through said bar portion and an enlarged abutment disc on said shank downwardly abutted against the upper surface of said bar portion and being of substantially the same outside diameter as the diameter of said ball portion and with said upper surface projecting horizontally outwardly of an upstanding cylindrical zone containing the outer peripheries of said ball portion and abutment disc, a support including an upstanding support member, the lower end of said support member defining a downwardly opening cylindrical cavity therein and being snugly downwardly telescoped over said ball member and disc with the lower end of said support member ownwardly abutted against said upper surface, and lock means carried by the portion of said support member defining said cavity releasably engageable with said hitch ball below said ball portion for preventing upward displacement of said support member from said upper surface.

6. The trailer hitch and support member combination of claim 5 wherein said support member comprises an upstanding tubular member whose lower end defines said recess, said lock means including a plurality of circumferentially spaced generally radial setscrews threadingly supported from said tubular member and clamp engageable with said shank portion below said ball portion.

7. The combination of claim 6 wherein said tubular member comprises a one piece tubular member.

8. The combination of claim 6 wherein said tubular member includes upper and lower small and large diameter tubular sections rotatably and telescopingly engaged with each other, said upper section including outer abutment means supported therefrom and downwardly abuttingly engageable with the upper end of said lower section, said lower section including a generally radial setscrew clamp engageable with a lower end portion of the upper section with which said setscrew is registrable.

9. A support member defining a generally plane surface, a ball member supported from said support member and including an outer ball portion disposed outward of said surface and a shank portion smaller in diameter than said ball portion extending between said ball portion and said support member and supporting said ball portion from said support member, said surface including portions thereof projecting outwardly of a cylindrical zone normal to said surface and containing the outer periphery of said ball portion, a pipe including one end thereof snugly telescoped over said ball portion and abutted against said surface portions, said one end of said pipe including peripherally spaced and threadingly supported generally radial setscrews releasably clamp engaged with said shank, said ball member including a diametrically enlarged abutment disc on said shank spaced from said ball portion and abuttingly engaged with said surface, said abutment disc being of substantially the same outside diameter as the diameter of said ball portion, said one end of said pipe also being snugly telescoped over said abutment disc.

10. The support member, ball member and pipe combination of claim 9 wherein said ball member comprises a trailer hitch ball member.

11. The support member, ball member and pipe combination of claim 10 including support means carried by the other end of said pipe for supporting a load therefrom.

12. A support member defining an outwardly facing surface, a ball member supported from said surface and projecting outwardly therefrom in the direction in which said surface faces, said ball member including an outer ball portion disposed outward of said surface and an elongated shank portion smaller in diameter than said ball portion extending between the latter and said support member and supporting said ball portion from said support member, said surface including portions thereof projecting outwardly of a cylindrical zone generally concentric with and extending about said elongated shank portion and containing the outer periphery of said ball portion, a tubular member including one end thereof snugly telescoped over said ball portion and abutted against said surface portions, said one end of said tubular member including peripherally spaced and threadedly supported generally radially setscrews releasably clamp engaged with said ball member at least closely adjacent the intersection of said ball and shank portions, means defining a generally cylindrical radially outwardly facing shoulder substantially coninciding with said cylindrical zone and projecting outwardly from said surface portions toward said outer ball portion, said one end of said tubular member also being telescoped over said shoulder, and support means carried by the other end of said tubular member for supporting a load therefrom.

* * * * *